United States Patent Office 3,296,189
Patented Jan. 3, 1967

3,296,189
CHEMICALLY CROSS-LINKED POLYETHYLENE STABILIZED WITH POLYMERIZED TRIMETHYL QUINOLINE
Warren O. Eastman, 3602 Fallen Timber Drive, Louisville, Ky. 40222
No Drawing. Continuation of application Ser. No. 105,868, Apr. 27, 1961. This application July 29, 1965, Ser. No. 475,841
6 Claims. (Cl. 260—45.8)

This invention relates to a composition of matter consisting of vulcanizable polyethylene which is protected from oxidative deterioration over a period of time. The application is a continuation of my application Serial No. 105,868, filed April 27, 1961, which in turn is a continuation-in-part of my application Serial No. 800,974, filed March 23, 1959 both of which are now abandoned.

Polyethylene cross-linked by a tertiary peroxide, such as di-α-cumyl peroxide, was disclosed and claimed in Gilbert and Precopio Application Serial No. 509,388, filed May 18, 1955 now Patent No. 3,079,370, and assigned to the same assignee as the present application. A similarly cross-linked polyethylene filled with silica, carbon black, alumina, or calcium silicate was disclosed and claimed in Gilbert and Precopio Patent No. 2,888,424, also assigned to the same assignee as the present application.

Peroxide vulcanized or cross-linked polyethylene possesses properties such as temperature stability, solvent resistance, and tensile strength which enable it to be used in many applications where thermoplastic polyethylene would be unsatisfactory. However, extreme care must be exercised in compounding the composition to avoid excess peroxide since the same properties which make peroxides cross-linking agents will bring about oxidative deterioration in the final product.

The solution to the problem of oxidative deterioration in the polyethylene caused by the presence of the tertiary peroxide would appear to be the addition of antioxidants such as those developed in rubber technology. However, antioxidants are substances which will selectively combine with oxygen thereby converting oxygen from a state in which it can promote oxidation of an important component of a composition to one in which it combines with a minor component which holds it in a state where it can do no further harm. It would be predicted that antioxidants would combine with tertiary peroxides or decomposition products thereof to cancel out both the cross-linking activity of the peroxide and the antioxidant activity and experimental evidence has shown that this is what happens in the case of most antioxidants.

The present invention has as one of its objects to provide a peroxide cross-linkable polyethylene composition which is stabilized against oxidative deterioration.

Another object of the invention is to provide a peroxide-cross-linked polyethylene composition which includes an antioxidant.

Briefly stated, in accordance with one of its embodiments, the invention is directed to a curable composition comprising polyethylene, a peroxide in which there is at least one unit of the structure

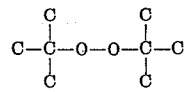

which substantially decomposes at temperatures in excess of 130° C., and a stabilizer consisting of polymerized trimethyldihydroquinoline.

In accordance with this invention, it has been discovered that trimethyldihydroquinolines, and particularly polymers of 1,2-dihydro-2,2,4-trimethylquinoline, a compound of the structure

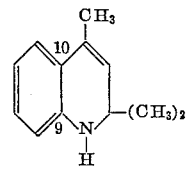

will act as antioxidants for peroxide-cross-linked polyethylene without significantly interfering with the cross-linking activity of the peroxide. When the trimethyldihydroquinoline is present in proportions of less than 1% based upon the weight of polyethylene present, there is frequently an enhancement of the properties of the product. For example, the addition of 0.5 part of polytrimethyldihydroquinoline per 100 parts of polyethylene produced a product having a tensile strength of about 2,700 pounds per square inch versus about 2,600 pounds per square inch for a control sample in which the trimethyldihydroquinoline was absent.

The polytrimethyldihydroquinoline can have substituents such as alkyl, alkoxy or phenyl groups in the 5 to 8 positions without interfering with the antioxidant activity and, therefore, inactive substituents in these positions are included in the term "trimethyldihydroquinoline." However, in the preferred form of the invention, a polymer of 1,2-dihydro-2,2,4-trimethylquinoline is used as the antioxidant.

If the antioxidant of this invention is present in excessive proportions, it has an inhibitory effect upon the activity of the cross-linking peroxide though this inhibitory effect is not so great as that produced by equivalent quantities of other antioxidants common to rubber technology. A preferred range of the trimethyldihydroquinoline is 0.25% to 1.5% by weight of the polyethylene present.

The trimethyldihydroquinoline antioxidants of this invention are operable both in filled and unfilled systems. Silica, carbon black, alumina, and calcium silicate are satisfactory filler materials in conjunction with the trimethyldihydroquinolines.

The present invention is directed to a composition which is suitable for both molding and extrusion. Its compounding is conventional in all respects. One method of handling is to introduce the components including the peroxide and trimethyldihydroquinoline to a Banbury mixer maintained at a temperature slightly above the melting temperature of the polyethylene used. This step is followed by a milling operation which further works the composition prior to a shredding and dicing step. The diced material may then be stored until final processing. It is preferable that the final processing take place within a relatively small number of days.

Preferably, the trimethyldihydroquinolines used in accordance with this invention are dimers or longer polymers, improved results accompanying the use of tetramers or polymers having longer chain lengths. Satisfactory polytrimethyldihydroquinolines are available through commercial channels.

The peroxides of this invention are characterized as substantially decomposing at temperatures in excess of 130° and having at least one unit of the structure

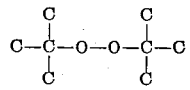

One of the best of the tertiary peroxides used as a cross-linking agent is di-α-cumyl peroxide, a compound of the structure

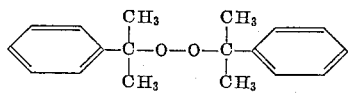

The following diperoxides are also useful

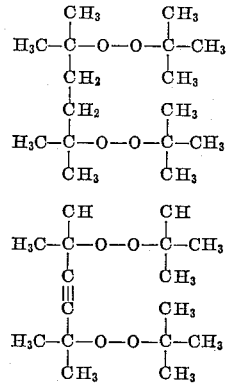

In general, tertiary peroxides which can be used to cure polyethylene are those having the following formula

R—O—O—R' where R and R' (which may or may not be similar) are radicals selected from the group consisting of

and

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$, and $R_6$. $R_1$, $R_2$, $R_3$, $R_4$ comprise alkyl radicals such as methyl, ethyl, propyl, butyl, pentyl, hexyl, heptyl, octyl, nonyl, decyl undecyl octadecyl etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkylalkyl radicals such as methylcyclobutyl, ethylcyclopentyl, tert-butyl-methylcyclohexyl, isopropylcyclohexyl, etc.; cycloalkylalkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propyl- naphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

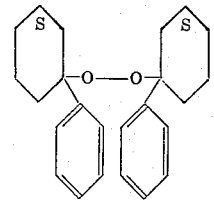

Mixtures of these peroxides may also be used.

In addition, these peroxides may contain inorganic groups, such as halogens, nitro groups, etc., for example, chlorophenyl, bromophenyl, nitrophenyl, etc.

While the proportion of peroxide used depends upon the final properties sought in the cured material, a range of 1% to 10% by weight of the polyethylene present satisfies most requirements and the usual proportion is of the order of 2%. Since the peroxide is more costly than polyethylene and any fillers which might be used, economy dictates using the minimum peroxide which will provide the properties desired in the cured material.

The invention applies generally to polyethylene whether it is made by the conventional high pressure process or the low pressure catalytic process. While polyethylene is the most important component of any of the compositions of this invention—and the proportions of peroxide and trimethyldihydroquinoline are recited in terms of the polyethylene present—other components may also be present. For example, filler materials such as those previously specified herein may be present in ratios as high as 4 parts of filler per part of polyethylene. The invention applies to copolymers of ethylene and other polymerizable materials such as propylene, ethyl acrylate, vinyl acetate and butylene. The copolymer materials may be present in proportions as low at 1% of the polyethylene to more than 50%. The invention likewise applies to mixtures of polyethylene and other polymers such as polyvinyl chloride, organopolysiloxanes, polymeric methyl acrylate, copolymers of butadiene and styrene, copolymers of butadiene and acrylonitrile, neoprene, polystyrene, the various natural rubbers, etc.

The polymerized trimethyldihydroquinoline stabilizers of this invention are quite unique in their application to peroxide-cured systems. A satisfactory antioxidant or stabilizer must not only impart good aging characteristics but must provide an extrusion mixture which does not produce a porous product. Such conventional rubber antioxidants as hydroquinone monobenzyl ether, polyalkyl polyphenol, octylated diphenylamine, di-tert-amyl-hydroquinone, phenyl-α-naphthylamine, the reaction product of diphenylamine and diisobutylene, and other produced porous products, suggesting poisoning of the peroxide by the antioxidant. Unpolymerized trimethyldihydroquinoline produced a satisfactory extrusion product which, however, had poor aging characteristics after exposure in an air oven for fourteen days at 165° C.

Below are given several examples, which are intended to be illustrative rather than limiting, of the compositions of this invention.

EXAMPLE 1

Bakelite 2005 polyethylene (100 parts) and Thermax carbon black (80 parts) was mixed at 250° F. in a Banbury type mixer after which it was worked on a mill at 220° F. at which time one part of polymerized 1,2-dihydro-2,2-trimethylquinoline and two parts of di-α-cumyl peroxide were added. The composition was molded in a press for four minutes at 260° F. after which the slab was steam cured for one minute at 240 p.s.i.g. A dumbbell sample one-eighth inch wide and 0.040 inch thick was then cut for testing. The tensile strength of this sample was 2420 p.s.i. and its elongation 295%. After six days in an air oven at 180° C. the tensile strength was 1863 p.s.i. and elongation 73%; and after 21 days in the air oven at 165° C., the tensile strength was 1802 p.s.i. and elongation 95%.

A control sample of the same composition except that the dihydrotrimethylquinoline was omitted had an initial tensile strength of 2520 p.s.i. and elongation 290%. After three days in an air oven at 165° C. this sample became brittle and remained in this state thereafter.

EXAMPLE 2

A sample was prepared in the same manner as set forth for Example 1 except that two parts of 1,2-dihydro-2,2,4-trimethylquinoline polymer were present instead of one part. The initial tensile strength of the test specimen was 2235 p.s.i. and the elongation 175%. After six days in an air oven at 180° C. the tensile strength was 2222 p.s.i. and the elongation 100%. After 21 days in an air oven at 165° C. the tensile strength was 1938 p.s.i. and the elongation 138%. Thus, it can be seen that the physical properties of the sample were maintained quite well at this proportion of trimethyldihydroquinoline. However, the sample was slightly porous suggesting that an excess of trimethyldihydroquinoline inhibits the activity of the peroxide to some degree.

EXAMPLE 3

Hercules No. 54 ethylene-propylene copolymer (100 parts) was mixed with semi-reinforcing furnace carbon black (75 parts) in a Banbury as described in Example 1 and the mixture passed to a heated mill where one part of polymerized 1,2-dihydro-2,2,4-trimethylquinoline, seven parts of maleic anhydride, 20 parts of zinc oxide, and four parts of di-α-cumyl peroxide were added. A test sample prepared as set forth for the sample of Example 1 had an initial tensile strength of 1990 p.s.i. and an elongation of 303%. After seven days in an air oven at 136° C. the sample had a tensile strength of 1865 p.s.i. and an elongation of 283%. A control sample prepared as above but with the one part of polytrimethyldihydroquinoline omitted had an initial tensile strength of 2013 p.s.i. and elongation of 290%. After seven days in the air oven at 136° C. the tensile strength of this sample had fallen to 526 p.s.i. and its elongation to 113%.

EXAMPLE 4

A control sample consisting of 100 parts of polyethylene, 100 parts of carbon black, and 1.75 parts of di-α-cumyl peroxide underwent a reduction in tensile strength from 2700 p.s.i. to 1800 p.s.i. after being aged for 64 hours at 136° C. This same material with 0.25 parts of 1,2-dihydro-2,2,4-trimethylquinoline polymer added gave a product having an initial tensile strength of 2700 p.s.i. which declined only to 2600 p.s.i. after an aging treatment for 64 hours at 136° C. The original elongation (percent stretch to rupture) of the control was 180%. After 64 hours at 136° C. this declined to 25%. The original elongation of the same material with 0.25% trimethyldihydroquinoline polymer was 193%. After aging for 64 hours at 136° C. the elongation increased to 240%.

EXAMPLE 5

A sample prepared in the same manner as that set forth for the sample of Example 1 except that 1.5 parts of 1,2-dihydro-2,2,4-trimethylquinoline polymer were present had an initial tensile strength of 2748 p.s.i. and an elongation of 270% and showed no porosity. After six days in an air oven at 180° C. the sample had a tensile strength of 2133 p.s.i. and an elongation of 83%. After 21 days in an air oven at 165° C. the sample had a tensile strength of 2185 p.s.i. and an elongation of 72%.

It should be understood that the air oven tests listed in the above examples are very rigorous. For example, correlation studies have shown that a sample which was reduced to 30% elongation after five hours at 210° C., or six days at 180° C., or 23 days at 165° C., or 125 days at 150° C. would have an expected service life of fifteen years under conditions of continuous service at 120° C. All of the samples in the above examples which contained polymerized trimethyldihydroquinoline would be expected to exceed this service life by a considerable margin.

While the invention has been described with reference to certain specific compositions, it is to be understood that the invention is to be limited in scope only as the appended claims may be limited in scope.

That which is claimed is:
1. A curable composition of matter comprising:
   (a) normally solid polyethylene,
   (b) from 1% to 10% by weight of the polyethylene present of an organic peroxide having each of the peroxide oxygen atoms linked directly to a tertiary carbon atom, said peroxide substantially decomposing at temperatures in excess of 130° C. thereby cross-linking the polyethylene of said composition, and
   (c) from 0.25% to 2.0% by weight of the polyethylene present of polymerized 1,2-dihydro-2,2,4-trimethylquinoline.
2. A cured composition of matter according to claim 1, said composition having been cured at a temperature in excess of 130° C.
3. A composition according to claim 1, wherein said peroxide is di-α-cumyl peroxide.
4. A cured composition according to claim 3, said composition having been cured at a temperature in excess of 130° C.
5. A curable composition of matter according to claim 1, further defined wherein said peroxide is selected from the group consisting of 2,5-bis (tertiary-butylperoxy-2,5-dimethyl) hexane and 2,5-bis (tertiary-butylperoxy-2,5-dimethyl) hexyne.
6. A cured composition of matter according to claim 5, said composition having been cured at a temperature in excess of 130° C.

References Cited by the Examiner

UNITED STATES PATENTS

| 2,852,488 | 9/1958 | Clark et al. | 260—45.9 |
| 2,888,424 | 5/1959 | Precopio et al. | 260—37 |
| 3,244,683 | 5/1966 | Kline | 260—45.8 |

FOREIGN PATENTS

| 520,923 | 1/1956 | Canada. |

LEON J. BERCOVITZ, *Primary Examiner.*

H. E. TAYLOR, *Assistant Examiner.*